(12) United States Patent
Yang et al.

(10) Patent No.: US 11,377,589 B2
(45) Date of Patent: Jul. 5, 2022

(54) EMULSIFER WITH HIGH TEMPERATURE RESISTANCE, LOW VISCOSITY AND LOW CORROSIVENESS, AND EMULSIFIED ACID SYSTEM COMPRISING SAME

(71) Applicant: SOUTHWEST PETROLEUM UNIVERSITY, Sichuan (CN)

(72) Inventors: Xiaojiang Yang, Sichuan (CN); Difei Han, Sichuan (CN); Jincheng Mao, Sichuan (CN); Heng Zhang, Sichuan (CN); Chong Lin, Sichuan (CN); Jinhua Mao, Sichuan (CN); Jinzhou Zhao, Sichuan (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 17/139,022

(22) Filed: Dec. 31, 2020

(65) Prior Publication Data

US 2021/0222057 A1    Jul. 22, 2021

(30) Foreign Application Priority Data

Dec. 31, 2019  (CN) .......................... 201911412695.3
Dec. 29, 2020  (CN) .......................... 202011604197.1

(51) Int. Cl.
*C09K 8/74* (2006.01)
*C09K 8/54* (2006.01)
*C09K 8/60* (2006.01)

(52) U.S. Cl.
CPC ............... *C09K 8/74* (2013.01); *C09K 8/54* (2013.01); *C09K 8/602* (2013.01); *C09K 2208/30* (2013.01); *C09K 2208/32* (2013.01)

(58) Field of Classification Search
None
See application file for complete search history.

(56) References Cited

U.S. PATENT DOCUMENTS

| | | | | |
|---|---|---|---|---|
| 4,725,372 | A * | 2/1988 | Teot | C09K 8/60 507/131 |
| 5,551,516 | A * | 9/1996 | Norman | E21B 43/267 507/239 |
| 5,964,295 | A * | 10/1999 | Brown | C09K 8/68 507/131 |
| 5,979,555 | A * | 11/1999 | Gadberry | C09K 8/68 166/275 |
| 5,979,557 | A * | 11/1999 | Card | C09K 8/74 166/281 |
| 10,870,790 | B2 * | 12/2020 | Mao | C09K 8/602 |
| 2011/0303414 | A1 * | 12/2011 | Seth | C09K 8/528 166/305.1 |
| 2019/0390104 | A1 | 12/2019 | Sultan et al. | |

FOREIGN PATENT DOCUMENTS

| | | |
|---|---|---|
| CN | 104592969 A | 5/2015 |
| CN | 109135716 A | 1/2019 |
| CN | 109135717 A | 1/2019 |

* cited by examiner

*Primary Examiner* — John J Figueroa

(57) ABSTRACT

An emulsifier with high temperature resistance, low viscosity and low corrosiveness, and an emulsified acid system comprising the same. The emulsifier includes a viscoelastic surfactant, which is prepared by a quaterization of fatty acid acyl propyl dimethylamine and a halogenated compound; by a quaterization of a long-chain halogenated hydrocarbon and a tertiary amine compound; or by a reaction of the fatty acid acyl propyl dimethylamine with a linking group synthesized by epichlorohydrin and an alkylamine compound.

9 Claims, 2 Drawing Sheets

Figure 1:
Figure 2:
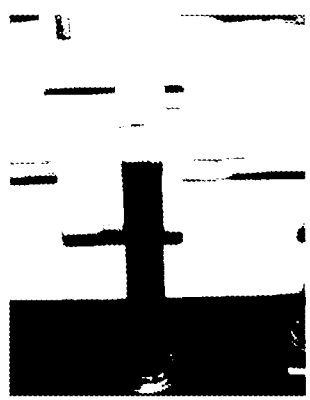
Figure 3:
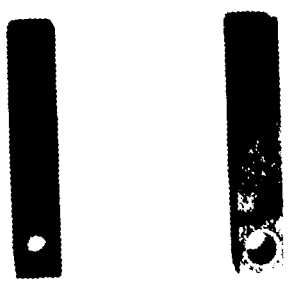
Figure 4:
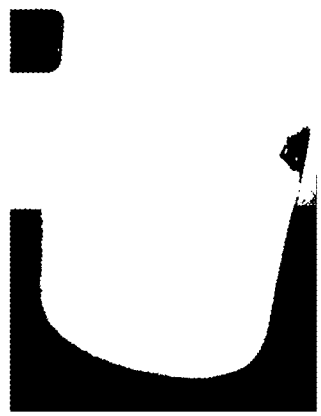
Figure 5:
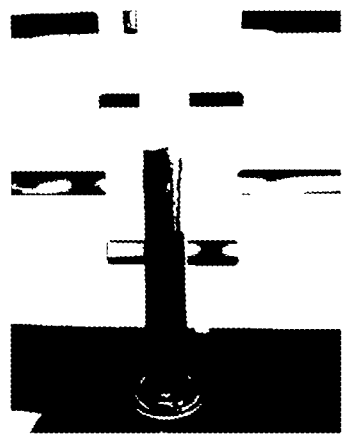
Figure 6:

EMULSIFIER WITH HIGH TEMPERATURE RESISTANCE, LOW VISCOSITY AND LOW CORROSIVENESS, AND EMULSIFIED ACID SYSTEM COMPRISING SAME

CROSS-REFERENCE TO RELATED APPLICATIONS

This application claims the benefit of priority from Chinese Patent Application Nos. 202011604197.1 and 201911412695.3, filed on Dec. 29, 2020 and Dec. 31, 2020, respectively. The content of the aforementioned application, including any intervening amendments thereto, is incorporated herein by reference in their entirety.

TECHNICAL FIELD

This application relates to development of an emulsified acid system for oil and gas fields, and more particularly to an emulsifier with high temperature resistance, low viscosity and low corrosiveness, and an emulsified acid system comprising the same.

BACKGROUND

Acidification is often performed to improve the production in the later period of oil and gas exploitation. As a non-oxidizing acid, hydrochloric acid is most commonly used in the acidification process, which can permeate into the pore channels by dissolution to produce artificial cracks and unblock the holes, thereby greatly enhancing the oil recovery. Unfortunately, it often fails to effectively create a long enough crack in carbonate rocks due to the large acid-rock reaction rate. In view of this, an emulsified acid system, which is a water-in-oil emulsion formed by mixing an oil phase with an acid fluid in the presence of an emulsifier, has been proposed. The emulsified acid system has excellent properties, but the existing emulsified acid systems are prone to structural damage to lose their functions under ultra-high temperature.

In order to improve the acidification of carbonate rocks at an ultra-high temperature, this disclosure provides a viscoelastic surfactant as an emulsifier and an emulsified acid system containing the same, where the emulsified acid system has strong temperature adaptability and even has desirable stability in an ultra-high temperature well.

SUMMARY

An object of this disclosure is to provide an emulsifier with high temperature resistance, low viscosity and low corrosiveness, and an emulsified acid system comprising the same to overcome the defects in the prior art, where the emulsified acid system prepared herein has advantages of good ultra-high temperature resistance, low viscosity, low corrosiveness, low level of pungent odor and no toxicity.

Technical solutions of this disclosure are described as follows.

In a first aspect, this application provides an emulsifier, comprising:

a viscoelastic surfactant;

wherein the viscoelastic surfactant is prepared by a quaterization of fatty acid acyl propyl dimethylamine and a halogenated compound;

by a quaterization of a linear halogenated hydrocarbon and a tertiary amine compound; or by a reaction of the fatty acid acyl propyl dimethylamine with a linking group formed by reaction of epichlorohydrin and an alkylamine compound; and the alkyl amine compound is butanolamine, 1,6-butanediamine or diallylamine.

In an embodiment, the viscoelastic surfactant comprises at least one hydrophobic chain.

In an embodiment, the viscoelastic surfactant is cationic or zwitterionic.

In an embodiment, the tertiary amine compound is 3,3'-iminobis (N,N-dimethylpropylamine) or N,N-dimethylpropylamine.

In an embodiment, the halogenated compound is prepared through steps of:

dropwise adding an epoxy haloalkane to a solution of a primary amine in absolute ethanol followed by reaction at room temperature for 8-12 h; and subjecting the reaction mixture to solid-liquid separation to remove solvent to obtain the halogenated compound;

wherein a molar ratio of the primary amine to the epoxy haloalkane is 1:(2-3).

In an embodiment, a halogen in the epoxy haloalkane is fluorine, chlorine, bromine or iodine.

In an embodiment, the epoxy haloalkane is epichlorohydrin.

In an embodiment, the primary amine is N,N-dimethylpropanediamine or butanolamine.

In an embodiment, the hydrophobic chain in the viscoelastic surfactant is an alkyl chain or a fatty acid chain with a length of 8-22 carbon atoms provided by the fatty acid acyl propyl dimethylamine.

In an embodiment, the fatty acid chain in the fatty acid acyl propyl dimethylamine is derived from erucic acid, docosanoic acid, oleic acid, stearic acid, arachidic acid, tetracosenic acid, heneicosanoic acid, heptadecanoic acid, hexadecanoic acid, pentadecanoic acid, tridecanoic acid, dodecanoic acid or undecanoic acid.

In an embodiment, the viscoelastic surfactant consists of components A, B and C in a weight ratio of (3-5):(3-5):(1-5); wherein the component A is prepared through a reaction of the fatty acid acyl propyl dimethylamine, epichlorohydrin and butanolamine;

the component B is prepared through a reaction of the fatty acid acyl propyl dimethylamine, epichlorohydrin and 1,6-butanediamine; and the component C is prepared through a reaction of the fatty acid acyl propyl dimethylamine, epichlorohydrin and diallylamine.

In an embodiment, the preparation of the component A comprises:

dropwise adding the epichlorohydrin to a solution of butanolamine in an organic solution followed by reaction at room temperature for 8-12 h, where a molar ratio of the butanolamine to the epichlorohydrin is 1:(2-3); subjecting the reaction mixture to solid-liquid separation to remove the organic solvent to obtain a linking group; mixing erucic acid acyl propyl dimethylamine and the linking group in a molar ratio of (2-3):1 followed by addition of the organic solvent; and reacting the reaction mixture under reflux at 70-90° C. followed by removing the organic solvent to obtain the component A.

In an embodiment, the preparation of the component B comprises:

dropwise adding the epichlorohydrin to a solution of 1,6-butanediamine in an organic solution followed by reaction at room temperature for 8-12 h, where a molar ratio of the 1,6-butanediamine to the epichlorohydrin is 1:(2-3);

subjecting the reaction mixture to solid-liquid separation to remove the organic solvent to obtain a linking group; mixing erucic acid acyl propyl dimethylamine and the linking group in a molar ratio of (4-5):1 followed by addition of the organic solvent; and reacting the reaction mixture under reflux for 7-10 h at 70-90° C. followed by removing the organic solvent to obtain the component B.

In an embodiment, the preparation of the component C comprises:

dropwise adding the epichlorohydrin to a solution of diallylamine in an organic solution followed by reaction at room temperature for 8-10 h, where a molar ratio of the diallylamine to the epichlorohydrin is (1-2):1; subjecting the reaction mixture to solid-liquid separation to remove the organic solvent to obtain a linking group; mixing erucic acid acyl propyl dimethylamine and the linking group in a molar ratio of (1-1.5):1 followed by addition of the organic solvent; and reacting the reaction mixture under reflux at 70-90° C. followed by removing the organic solvent to obtain the component C.

In an embodiment, the halogenated hydrocarbon is halogenated octadecane, halogenated hexadecane, halogenated tetradecane, halogenated dodecane, halogenated undecane, or a derivative thereof.

In a second aspect, this disclosure provides an emulsified acid, comprising 5-10 parts by weight of the emulsifier, 30-40 parts by weight of an acid solution and 50-65 parts by weight of an auxiliary.

In an embodiment, the acid solution is hydrochloric acid, mud acid or an organic acid.

In an embodiment, the auxiliary comprises 2-5 parts by weight of a corrosion inhibitor, 2-5 parts by weight of a ferric ion stabilizer and diesel oil.

In an embodiment, the auxiliary further comprises 0.1-5 parts by weight of sorbitan fatty acid ester polyoxyethylene ether, fatty alcohol-polyoxyethylene ether, alkyl phenol polyoxyethylene ether, polyoxyethylene castor oil ether, fatty alcohol polyoxyethylene ester, fatty acid polyoxyethylene ester, polyethylene glycol, alkyl amine polyoxyethylene ether, polyoxyethylene fatty acid ester or a combination thereof for compounding with the viscoelastic surfactant.

In an embodiment, the diesel oil is $-20^{\#}$, $-10^{\#}$ or $0^{\#}$ diesel oil; the corrosion inhibitor is Mannich base synthesized by ethylenediamine, acetophenone and formaldehyde; and the ferric ion stabilizer is sodium erythorbate.

Compared to the prior art, this disclosure has the following beneficial effects.

The method provided herein has simple operation, and the emulsified acid prepared thereby is a kind of oil-in-acid emulsion, which has excellent temperature resistance and stability, low viscosity and friction and slight corrosion to metal pipes. This emulsified acid system can keep stable at 160° C. for at least 7 h, so that it can effectively decelerate the acid-rock reaction in high temperature deep wells, and reduce a corrosion rate of acid solution on pipes.

DETAILED DESCRIPTION OF EMBODIMENTS

This disclosure will be further described in detail below with the embodiments to help those skilled in the art understand the technical solutions of this disclosure, but it should be noted that these embodiments are not intended to limit the disclosure. Any modifications, changes and replacements made by those skilled in the art without departing from the spirit of the disclosure should fall within the scope of the disclosure defined by the appended claims.

EXAMPLE 1

Provided herein was an emulsified acid system with ultra-high temperature resistance, low viscosity and low corrosiveness, consisting of: 4 parts by weight of a viscoelastic surfactant with 3 hydrophobic tails which was prepared from docosaenoic acid acyl propyl dimethylamine and a halogenated compound, 4 parts by weight of sorbitan fatty acid ester polyoxyethylene ether, 2 parts by weight of Mannich base synthesized by a reaction of ethanediamine, acetophenone and formaldehyde, 2 parts by weight of sodium erythorbate, 30 parts by weight of hydrochloric acid and diesel oil.

The halogenated compound was prepared as follows. Epichlorohydrin was dropwise added to a solution of N,N-dimethylpropanediamine in ethanol, where a molar ratio of N,N-dimethylpropanediamine to epichlorohydrin was 1:3. The reaction mixture was reacted at room temperature for 10 h, and then subjected to solid-liquid separation to remove solvent to obtain the halogenated compound with 3 halogenated head groups.

The above emulsified acid system was prepared through the following steps.

The viscoelastic surfactant and the Mannich base were added to the diesel oil, and the sodium erythorbate was added to hydrochloric acid. The oil phase was dispersed using a high-speed disperser at 2800 r/min for 10 min, and at the same time, the hydrochloric acid solution was dropwise added to the oil phase using a peristaltic pump at 6 mL/min to obtain the emulsified acid system. The prepared emulsified acid system was subjected to performance testing, and the results were shown in Table 1.

TABLE 1

| Performance of the emulsified acid system | | | | | |
|---|---|---|---|---|---|
| Viscosity (mPa · s) | Demulsification rate (%, at 160° C. for 7 h) | Conductivity (μs/cm) | Acid-rock reaction rate ($10^{-6}$ mol/cm$^2$ · s) | Friction relative to clean water (%) | Corrosion rate of steel plate (mm/a) |
| 24 | 0.8 | 0.054 | 1.32 | 89 | 1.2687 |

EXAMPLE 2

Provided herein was an emulsified acid system with ultra-high temperature resistance, low viscosity and low corrosiveness, consisting of: 4 parts by weight of a viscoelastic surfactant with 2 hydrophobic tails which was prepared from docosaenoic acid acyl propyl dimethylamine and a halogenated compound, 4 parts by weight of sorbitan fatty acid ester polyoxyethylene ether, 2 parts by weight of Mannich base synthesized by a reaction of ethanediamine, acetophenone and formaldehyde, 2 parts by weight of sodium erythorbate, 30 parts by weight of hydrochloric acid and diesel oil.

The halogenated compound was prepared as follows. Epichlorohydrin was dropwise added to a solution of butanolamine in an organic solvent, where a molar ratio of butanolamine to epichlorohydrin was 1:2. The reaction mixture was reacted at room temperature for 10 h, and then subjected to solid-liquid separation to remove solvent to obtain the halogenated compound with 2 halogenated head groups.

The above emulsified acid system was prepared through the following steps.

The viscoelastic surfactant and the Mannich base were added to the diesel oil, and the sodium erythorbate was added to hydrochloric acid. The oil phase was dispersed using a high-speed disperser at 2800 r/min for 10 min, and at the same time, the hydrochloric acid solution was dropwise added to the oil phase using a peristaltic pump at 6 mL/min to obtain the emulsified acid system. The prepared emulsified acid system was subjected to performance testing, and the results were shown in Table 2.

TABLE 2

Performance of the emulsified acid system

| Viscosity (mPa·s) | Demulsification rate (%, at 160° C. for 7 h) | Conductivity (μs/cm) | Acid-rock reaction rate ($10^{-6}$ mol/cm$^2$·s) | Friction relative to clean water (%) | Corrosion rate of steel plate (mm/a) |
|---|---|---|---|---|---|
| 23 | 1.0 | 0.067 | 1.37 | 89 | 1.3246 |

EXAMPLE 3

Provided herein was an emulsified acid system with ultra-high temperature resistance, low viscosity and low corrosiveness, consisting of: 4 parts by weight of a viscoelastic surfactant with one hydrophobic tail which was prepared from docosaenoic acid acyl propyl dimethylamine and 1-chlorobutane, 4 parts by weight of sorbitan fatty acid ester polyoxyethylene ether, 2 parts by weight of Mannich base synthesized by a reaction of ethanediamine, acetophenone and formaldehyde, 2 parts by weight of sodium erythorbate, 30 parts by weight of hydrochloric acid and diesel oil.

The above emulsified acid system was prepared through the following steps.

The viscoelastic surfactant and the Mannich base were added to the diesel oil, and the sodium erythorbate was added to hydrochloric acid. The oil phase was dispersed using a high-speed disperser at 2800 r/min for 10 min, and at the same time, the hydrochloric acid solution was dropwise added to the oil phase using a peristaltic pump at 6 mL/min to obtain the emulsified acid system. The prepared emulsified acid system was subjected to performance testing, and the results were shown in Table 3.

TABLE 3

Performance of the emulsified acid system

| Viscosity (mPa·s) | Demulsification rate (%, at 160° C. for 7 h) | Conductivity (μs/cm) | Acid-rock reaction rate ($10^{-6}$ mol/cm$^2$·s) | Friction relative to clean water (%) | Corrosion rate of steel plate (mm/a) |
|---|---|---|---|---|---|
| 22 | 1.2 | 0.082 | 1.44 | 88 | 1.4237 |

It can be concluded from Examples 1-3 that an increase in the number of hydrophobic chains will bring enhanced emulsifying effect and stability, indicating an obvious structure-activity relationship between the viscoelastic surfactant and the emulsifying effect.

EXAMPLE 4

Provided herein was an emulsified acid system with ultra-high temperature resistance, low viscosity and low corrosiveness, consisting of: 4 parts by weight of a viscoelastic surfactant with 2 hydrophobic tails which was prepared from docosaenoic acid acyl propyl dimethylamine and a halogenated compound (referring to Example 2 for the specific preparation), 4 parts by weight of sorbitan fatty acid ester polyoxyethylene ether, 2 parts by weight of Mannich base synthesized by a reaction of ethanediamine, acetophenone and formaldehyde, 2 parts by weight of sodium erythorbate, 30 parts by weight of hydrochloric acid and diesel oil.

The above emulsified acid system was prepared through the following steps.

The viscoelastic surfactant and the Mannich base were added to the diesel oil, and the sodium erythorbate was added to hydrochloric acid. The oil phase was dispersed using a high-speed disperser at 2800 r/min for 10 min, and at the same time, the hydrochloric acid solution was dropwise added to the oil phase using a peristaltic pump at 6 mL/min to obtain the emulsified acid system. The prepared emulsified acid system was subjected to performance testing, and the results were shown in Table 4.

TABLE 4

| | Performance of the emulsified acid system | | | | |
|---|---|---|---|---|---|
| Viscosity (mPa · s) | Demulsification rate (%, at 160° C. for 7 h) | Conductivity (μs/cm) | Acid-rock reaction rate ($10^{-6}$ mol/cm$^2$ · s) | Friction relative to clean water (%) | Corrosion rate of steel plate (mm/a) |
| 23 | 1.1 | 0.073 | 1.42 | 92 | 1.3569 |

EXAMPLE 5

Provided herein was an emulsified acid system with ultra-high temperature resistance, low viscosity and low corrosiveness, consisting of: 4 parts by weight of a viscoelastic surfactant with 2 hydrophobic tails which was prepared from heneicosanoic acid acyl propyl dimethylamine and a halogenated compound (referring to Example 2 for the preparation), 4 parts by weight of sorbitan fatty acid ester polyoxyethylene ether, 2 parts by weight of Mannich base synthesized by a reaction of ethanediamine, acetophenone and formaldehyde, 2 parts by weight of sodium erythorbate, 30 parts by weight of hydrochloric acid and diesel oil.

The above emulsified acid system was prepared through the following steps.

The viscoelastic surfactant and the Mannich base were added to the diesel oil, and the sodium erythorbate was added to hydrochloric acid. The oil phase was dispersed using a high-speed disperser at 2800 r/min for 10 min, and at the same time, the hydrochloric acid solution was dropwise added to the oil phase using a peristaltic pump at 6 mL/min to obtain the emulsified acid system. The prepared emulsified acid system was subjected to performance testing, and the results were shown in Table 5.

TABLE 5

| | Performance of the emulsified acid system | | | | |
|---|---|---|---|---|---|
| Viscosity (mPa · s) | Demulsification rate (%, at 160° C. for 7 h) | Conductivity (μs/cm) | Acid-rock reaction rate ($10^{-6}$ mol/cm$^2$ · s) | Friction relative to clean water (%) | Corrosion rate of steel plate (mm/a) |
| 17 | 1.3 | 0.068 | 1.45 | 93 | 1.3584 |

EXAMPLE 6

Provided herein was an emulsified acid system with ultra-high temperature resistance, low viscosity and low corrosiveness, consisting of 4 parts by weight of a viscoelastic surfactant with 2 hydrophobic tails which was prepared from eicosenoic acid acyl propyl dimethylamine and a halogenated compound (referring to Example 2 for the preparation), 4 parts by weight of sorbitan fatty acid ester polyoxyethylene ether, 2 parts by weight of Mannich base synthesized by a reaction of ethanediamine, acetophenone and formaldehyde, 2 parts by weight of sodium erythorbate, 30 parts by weight of hydrochloric acid and diesel oil.

The above emulsified acid system was prepared through the following steps.

The viscoelastic surfactant and the Mannich base were added to the diesel oil, and the sodium erythorbate was added to hydrochloric acid. The oil phase was dispersed using a high-speed disperser at 2800 r/min for 10 min, and at the same time, the hydrochloric acid solution was dropwise added to the oil phase using a peristaltic pump at 6 mL/min to obtain the emulsified acid system. The prepared emulsified acid system was subjected to performance testing, and the results were shown in Table 6.

TABLE 6

| | Performance of the emulsified acid system | | | | |
|---|---|---|---|---|---|
| Viscosity (mPa · s) | Demulsification rate (%, at 160° C. for 7 h) | Conductivity (μs/cm) | Acid-rock reaction rate ($10^{-6}$ mol/cm$^2$ · s) | Friction relative to clean water (%) | Corrosion rate of steel plate (mm/a) |
| 16 | 1.4 | 0.057 | 1.36 | 94 | 1.3613 |

EXAMPLE 7

Provided herein was an emulsified acid system with ultra-high temperature resistance, low viscosity and low corrosiveness, consisting of: 4 parts by weight of a viscoelastic surfactant with 2 hydrophobic tails which was prepared from eicosanoic acid acyl propyl dimethylamine and a halogenated compound (referring to Example 2 for the preparation), 4 parts by weight of sorbitan fatty acid ester polyoxyethylene ether, 2 parts by weight of Mannich base synthesized by a reaction of ethanediamine, acetophenone and formaldehyde, 2 parts by weight of sodium erythorbate, 30 parts by weight of hydrochloric acid and diesel oil.

The above emulsified acid system was prepared through the following steps.

The viscoelastic surfactant and the Mannich base were added to the diesel oil, and the sodium erythorbate was added to hydrochloric acid. The oil phase was dispersed using a high-speed disperser at 2800 r/min for 10 min, and at the same time, the hydrochloric acid solution was dropwise added to the oil phase using a peristaltic pump at 6 mL/min to obtain the emulsified acid system. The prepared emulsified acid system was subjected to performance testing, and the results were shown in Table 7.

TABLE 7

| | Performance of the emulsified acid system | | | | |
|---|---|---|---|---|---|
| Viscosity (mPa · s) | Demulsification rate (%, at 160° C. for 7 h) | Conductivity (μs/cm) | Acid-rock reaction rate ($10^{-6}$ mol/cm$^2$ · s) | Friction relative to clean water (%) | Corrosion rate of steel plate (mm/a) |
| 16 | 1.5 | 0.068 | 1.42 | 93 | 1.3621 |

EXAMPLE 8

Provided herein was an emulsified acid system with ultra-high temperature resistance, low viscosity and low corrosiveness, consisting of: 4 parts by weight of a viscoelastic surfactant with 2 hydrophobic tails which was prepared from octadecenoic acid acyl propyl dimethylamine and a halogenated compound (referring to Example 2 for the preparation), 4 parts by weight of alkyl amine polyoxyethylene ether, 2 parts by weightparts by weight of Mannich base synthesized by a reaction of ethanediamine, acetophenone and formaldehyde, 2 parts by weight of sodium erythorbate, 30 parts by weight of hydrochloric acid and diesel oil.

The above emulsified acid system was prepared through the following steps.

The viscoelastic surfactant and the Mannich base were added to the diesel oil, and the sodium erythorbate was added to hydrochloric acid. The oil phase was dispersed using a high-speed disperser at 2800 r/min for 10 min, and at the same time, the hydrochloric acid solution was dropwise added to the oil phase using a peristaltic pump at 6 mL/min to obtain the emulsified acid system. The prepared emulsified acid system was subjected to performance testing, and the results were shown in Table 8.

TABLE 8

| | | Performance of the emulsified acid system | | | |
|---|---|---|---|---|---|
| Viscosity (mPa · s) | Demulsification rate (%, at 160° C. for 7 h) | Conductivity (μs/cm) | Acid-rock reaction rate ($10^{-6}$ mol/cm$^2$ · s) | Friction relative to clean water (%) | Corrosion rate of steel plate (mm/a) |
| 15 | 1.3 | 0.043 | 1.41 | 93 | 1.3642 |

EXAMPLE 9

Provided herein was an emulsified acid system with ultra-high temperature resistance, low viscosity and low corrosiveness, consisting of: 4 parts by weight of a viscoelastic surfactant with 2 hydrophobic tails which was prepared from octadecanoic acid acyl propyl dimethylamine and a halogenated compound (referring to Example 2 for preparation method), 4 parts by weight of alkyl amine polyoxyethylene ether, 2 parts by weight of Mannich base synthesized by a reaction of ethanediamine, acetophenone and formaldehyde, 2 parts by weight of sodium erythorbate, 30 parts by weight of hydrochloric acid and diesel oil.

The above emulsified acid system was prepared through the following steps.

The viscoelastic surfactant and the Mannich base were added to the diesel oil, and the sodium erythorbate was added to hydrochloric acid. The oil phase was dispersed using a high-speed disperser at 2800 r/min for 10 min, and at the same time, the hydrochloric acid solution was dropwise added to the oil phase using a peristaltic pump at 6 mL/min to obtain the emulsified acid system. The prepared emulsified acid system was subjected to performance testing, and the results were shown in Table 9.

TABLE 9

| | | Performance of the emulsified acid system | | | |
|---|---|---|---|---|---|
| Viscosity (mPa · s) | Demulsification rate (%, at 160° C. for 7 h) | Conductivity (μs/cm) | Acid-rock reaction rate ($10^{-6}$ mol/cm$^2$ · s) | Friction relative to clean water (%) | Corrosion rate of steel plate (mm/a) |
| 15 | 1.6 | 0.048 | 1.47 | 93 | 1.3691 |

EXAMPLE 10

Provided herein was an emulsified acid system with ultra-high temperature resistance, low viscosity and low corrosiveness, consisting of: 4 parts by weight of a viscoelastic surfactant with 2 hydrophobic tails which was prepared from hexadecenoic acid acyl propyl dimethylamine and a halogenated compound (referring to Example 2 for the preparation), 4 parts by weight of alkyl amine polyoxyethylene ether, 2 parts by weight of Mannich base synthesized by a reaction of ethanediamine, acetophenone and formaldehyde, 2 parts by weight of sodium erythorbate, 30 parts by weight of hydrochloric acid and diesel oil.

The above emulsified acid system was prepared through the following steps.

The viscoelastic surfactant and the Mannich base were added to the diesel oil, and the sodium erythorbate was added to hydrochloric acid. The oil phase was dispersed using a high-speed disperser at 2800 r/min for 10 min, and at the same time, the hydrochloric acid solution was dropwise added to the oil phase using a peristaltic pump at 6 mL/min to obtain the emulsified acid system. The prepared emulsified acid system was subjected to performance testing, and the results were shown in Table 10.

TABLE 10

| | | Performance of the emulsified acid system | | | |
|---|---|---|---|---|---|
| Viscosity (mPa·s) | Demulsification rate (%, at 160° C. for 7 h) | Conductivity (μs/cm) | Acid-rock reaction rate ($10^{-6}$ mol/cm$^2$·s) | Friction relative to clean water (%) | Corrosion rate of steel plate (mm/a) |
| 15 | 1.6 | 0.058 | 1.37 | 94 | 1.3732 |

EXAMPLE 11

Provided herein was an emulsified acid system with ultra-high temperature resistance, low viscosity and low corrosiveness, consisting of: 4 parts by weight of a viscoelastic surfactant with 2 hydrophobic tails which was prepared from hexadecanoic acid acyl propyl dimethylamine and a halogenated compound (referring to Example 2 for the preparation), 4 parts by weight of alkyl amine polyoxyethylene ether, 2 parts by weight of Mannich base synthesized by a reaction of ethanediamine, acetophenone and formaldehyde, 2 parts by weight of sodium erythorbate, 30 parts by weight of hydrochloric acid and diesel oil.

The above emulsified acid system was prepared through the following steps.

The viscoelastic surfactant and the Mannich base were added to the diesel oil, and the sodium erythorbate was added to hydrochloric acid. The oil phase was dispersed using a high-speed disperser at 2800 r/min for 10 min, and at the same time, the hydrochloric acid solution was dropwise added to the oil phase using a peristaltic pump at 6 mL/min to obtain the emulsified acid system. The prepared emulsified acid system was subjected to performance testing, and the results were shown in Table 11.

TABLE 11

| | | Performance of the emulsified acid system | | | |
|---|---|---|---|---|---|
| Viscosity (mPa·s) | Demulsification rate (%, at 160° C. for 7 h) | Conductivity (μs/cm) | Acid-rock reaction rate ($10^{-6}$ mol/cm$^2$·s) | Relative friction of clean water (%) | Corrosion rate of steel plate (mm/a) |
| 18 | 1.5 | 0.056 | 1.38 | 93 | 1.3745 |

EXAMPLE 12

Provided herein was an emulsified acid system with ultra-high temperature resistance, low viscosity and low corrosiveness, consisting of: 4 parts by weight of a viscoelastic surfactant with 2 hydrophobic tails which was prepared from pentadecanoic acid acyl propyl dimethylamine and a halogenated compound (referring to Example 2 for the preparation), 4 parts by weight of alkyl amine polyoxyethylene ether, 2 parts by weight of Mannich base synthesized by a reaction of ethanediamine, acetophenone and formaldehyde, 2 parts by weight of sodium erythorbate, 30 parts by weight of hydrochloric acid and diesel oil.

The above emulsified acid system was prepared through the following steps.

The viscoelastic surfactant and the Mannich base were added to the diesel oil, and the sodium erythorbate was added to hydrochloric acid. The oil phase was dispersed using a high-speed disperser at 2800 r/min for 10 min, and at the same time, the hydrochloric acid solution was dropwise added to the oil phase using a peristaltic pump at 6 mL/min to obtain the emulsified acid system. The prepared emulsified acid system was subjected to performance testing, and the results were shown in Table 12.

TABLE 12

| | | Performance of the emulsified acid system | | | |
|---|---|---|---|---|---|
| Viscosity (mPa · s) | Demulsification rate (%, at 160° C. for 7 h) | Conductivity (μs/cm) | Acid-rock reaction rate ($10^{-6}$ mol/cm$^2$ · s) | Friction relative to clean water (%) | Corrosion rate of steel plate (mm/a) |
| 17 | 1.5 | 0.052 | 1.38 | 92 | 1.3752 |

EXAMPLE 13

Provided herein was an emulsified acid system with ultra-high temperature resistance, low viscosity and low corrosiveness, consisting of: 4 parts by weight of a viscoelastic surfactant with 2 hydrophobic tails which was prepared from tetradecenoic acid acyl propyl dimethylamine and a halogenated compound (referring to Example 2 for preparation method), 4 parts by weight of alkyl amine polyoxyethylene ether, 2 parts by weight of Mannich base synthesized by a reaction of ethanediamine, acetophenone and formaldehyde, 2 parts by weight of sodium erythorbate, 30 parts by weight of hydrochloric acid and diesel oil.

The above emulsified acid system was prepared through the following steps.

The viscoelastic surfactant and the Mannich base were added to the diesel oil, and the sodium erythorbate was added to hydrochloric acid. The oil phase was dispersed using a high-speed disperser at 2800 r/min for 10 min, and at the same time, the hydrochloric acid solution was dropwise added to the oil phase using a peristaltic pump at 6 mL/min to obtain the emulsified acid system. The prepared emulsified acid system was subjected to performance testing, and the results were shown in Table 13.

TABLE 13

| | | Performance of the emulsified acid system | | | |
|---|---|---|---|---|---|
| Viscosity (mPa · s) | Demulsification rate (%, at 160° C. for 7 h) | Conductivity (μs/cm) | Acid-rock reaction rate ($10^{-6}$ mol/cm$^2$ · s) | Friction relative to clean water (%) | Corrosion rate of steel plate (mm/a) |
| 15 | 1.6 | 0.062 | 1.42 | 93 | 1.3735 |

EXAMPLE 14

Provided herein was an emulsified acid system with ultra-high temperature resistance, low viscosity and low corrosiveness, consisting of: 4 parts by weight of a viscoelastic surfactant with 2 hydrophobic tails which was prepared from tetradecenoic acid acyl propyl dimethylamine and a halogenated compound (referring to Example 2 for the preparation), 4 parts by weight of alkyl amine polyoxyethylene ether, 2 parts by weight of Mannich base synthesized by a reaction of ethanediamine, acetophenone and formaldehyde, 2 parts by weight of sodium erythorbate, 30 parts by weight of hydrochloric acid and diesel oil.

The above emulsified acid system was prepared through the following steps.

The viscoelastic surfactant and the Mannich base were added to the diesel oil, and the sodium erythorbate was added to hydrochloric acid. The oil phase was dispersed using a high-speed disperser at 2800 r/min for 10 min, and at the same time, the hydrochloric acid solution was dropwise added to the oil phase using a peristaltic pump at 6 mL/min to obtain the emulsified acid system. The prepared emulsified acid system was subjected to performance testing, and the results were shown in Table 14.

TABLE 14

| | | Performance of the emulsified acid system | | | |
|---|---|---|---|---|---|
| Viscosity (mPa · s) | Demulsification rate (%, at 160° C. for 7 h) | Conductivity (μs/cm) | Acid-rock reaction rate ($10^{-6}$ mol/cm$^2$ · s) | Friction relative to clean water (%) | Corrosion rate of steel plate (mm/a) |
| 12 | 1.7 | 0.068 | 1.46 | 91 | 1.3762 |

EXAMPLE 15

Provided herein was an emulsified acid system with ultra-high temperature resistance, low viscosity and low corrosiveness, consisting of: 4 parts by weight of a viscoelastic surfactant with 2 hydrophobic tails which was prepared from 3,3'-iminobis (N,N-dimethylpropylamine) and a halogenated octadecane, 4 parts by weight of alkyl amine polyoxyethylene ether, 2 parts by weight of Mannich base synthesized by a reaction of ethanediamine, acetophenone and formaldehyde, 2 parts by weight of sodium erythorbate, 30 parts by weight of hydrochloric acid and diesel oil.

The above emulsified acid system was prepared through the following steps.

The viscoelastic surfactant and the Mannich base were added to the diesel oil, and the sodium erythorbate was added to hydrochloric acid. The oil phase was dispersed using a high-speed disperser at 2800 r/min for 10 min, and at the same time, the hydrochloric acid solution was dropwise added to the oil phase using a peristaltic pump at 6 mL/min to obtain the emulsified acid system. The prepared emulsified acid system was subjected to performance testing, and the results were shown in Table 15.

TABLE 15

| | | Performance of the emulsified acid system | | | |
|---|---|---|---|---|---|
| Viscosity (mPa · s) | Demulsification rate (%, at 160° C. for 7 h) | Conductivity (μs/cm) | Acid-rock reaction rate ($10^{-6}$ mol/cm$^2$ · s) | Friction relative to clean water (%) | Corrosion rate of steel plate (mm/a) |
| 18 | 1.3 | 0.056 | 1.35 | 92 | 1.3726 |

EXAMPLE 16

Provided herein was an emulsified acid system with ultra-high temperature resistance, low viscosity and low corrosiveness, consisting of: 4 parts by weight of a viscoelastic surfactant with 2 hydrophobic tails which was prepared from 3,3'-iminobis (N,N-dimethylpropylamine) and a halogenated hexadecane, 4 parts by weight of alkyl phenol polyoxyethylene ether, 2 parts by weight of Mannich base synthesized by a reaction of ethanediamine, acetophenone and formaldehyde, 2 parts by weight of sodium erythorbate, 30 parts by weight of hydrochloric acid and diesel oil.

The above emulsified acid system was prepared through the following steps.

The viscoelastic surfactant and the Mannich base were added to the diesel oil, and the sodium erythorbate was added to hydrochloric acid. The oil phase was dispersed using a high-speed disperser at 2800 r/min for 10 min, and at the same time, the hydrochloric acid solution was dropwise added to the oil phase using a peristaltic pump at 6 mL/min to obtain the emulsified acid system. The prepared emulsified acid system was subjected to performance testing, and the results were shown in Table 16.

TABLE 16

| | | Performance of the emulsified acid system | | | |
|---|---|---|---|---|---|
| Viscosity (mPa·s) | Demulsification rate (%, at 160° C. for 7 h) | Conductivity (μs/cm) | Acid-rock reaction rate ($10^{-6}$ mol/cm$^2$·s) | Friction relative to clean water (%) | Corrosion rate of steel plate (mm/a) |
| 18 | 1.4 | 0.062 | 1.35 | 91 | 1.3766 |

EXAMPLE 17

Provided herein was an emulsified acid system with ultra-high temperature resistance, low viscosity and low corrosiveness, consisting of: 4 parts by weight of a viscoelastic surfactant with a hydrophobic tail which was prepared from N,N-dimethylpropylamine and a halogenated hexadecane, 4 parts by weight of alkyl phenol polyoxyethylene ether, 2 parts by weight of Mannich base synthesized by a reaction of ethanediamine, acetophenone and formaldehyde, 2 parts by weight of sodium erythorbate, 30 parts by weight of hydrochloric acid and diesel oil.

The above emulsified acid system was prepared through the following steps.

The viscoelastic surfactant and the Mannich base were added to the diesel oil, and the sodium erythorbate was added to hydrochloric acid. The oil phase was dispersed using a high-speed disperser at 2800 r/min for 10 min, and at the same time, the hydrochloric acid solution was dropwise added to the oil phase using a peristaltic pump at 6 mL/min to obtain the emulsified acid system. The prepared emulsified acid system was subjected to performance testing, and the results were shown in Table 17.

TABLE 17

| | | Performance of the emulsified acid system | | | |
|---|---|---|---|---|---|
| Viscosity (mPa·s) | Demulsification rate (%, at 160° C. for 7 h) | Conductivity (μs/cm) | Acid-rock reaction rate ($10^{-6}$ mol/cm$^2$·s) | Friction relative to clean water (%) | Corrosion rate of steel plate (mm/a) |
| 18 | 1.5 | 0.068 | 1.37 | 93 | 1.3844 |

EXAMPLE 18

Provided herein was an emulsified acid system with ultra-high temperature resistance, low viscosity and low corrosiveness, consisting of: 4 parts by weight of a viscoelastic surfactant with 2 hydrophobic tails which was prepared from 3,3'-iminobis (N,N-dimethylpropylamine) and a halogenated tetradecane, 4 parts by weight of alkyl phenol polyoxyethylene ether, 2 parts by weight of Mannich base synthesized by a reaction of ethanediamine, acetophenone and formaldehyde, 2 parts by weight of sodium erythorbate, 30 parts by weight of hydrochloric acid and diesel oil.

The above emulsified acid system was prepared through the following steps.

The viscoelastic surfactant and the Mannich base were added to the diesel oil, and the sodium erythorbate was added to hydrochloric acid. The oil phase was dispersed using a high-speed disperser at 2800 r/min for 10 min, and at the same time, the hydrochloric acid solution was dropwise added to the oil phase using a peristaltic pump at 6 mL/min to obtain the emulsified acid system. The prepared emulsified acid system was subjected to performance testing, and the results were shown in Table 18.

TABLE 18

| | Performance of the emulsified acid system | | | | |
|---|---|---|---|---|---|
| Viscosity (mPa · s) | Demulsification rate (%, at 160° C. for 7 h) | Conductivity (µs/cm) | Acid-rock reaction rate ($10^{-6}$ mol/cm$^2$ · s) | Friction relative to clean water (%) | Corrosion rate of steel plate (mm/a) |
| 17 | 1.4 | 0.055 | 1.41 | 91 | 1.3716 |

EXAMPLE 19

Provided herein was an emulsified acid system with ultra-high temperature resistance, low viscosity and low corrosiveness, consisting of: 4 parts by weight of a viscoelastic surfactant with 2 hydrophobic tails which was prepared from 3,3'-iminobis (N,N-dimethylpropylamine) and a halogenated dodecane, 4 parts by weight of alkyl phenol polyoxyethylene ether, 2 parts by weight of Mannich base synthesized by a reaction of ethanediamine, acetophenone and formaldehyde, 2 parts by weight of sodium erythorbate, 30 parts by weight of hydrochloric acid and diesel oil.

The above emulsified acid system was prepared through the following steps.

The viscoelastic surfactant and the Mannich base were added to the diesel oil, and the sodium erythorbate was added to hydrochloric acid. The oil phase was dispersed using a high-speed disperser at 2800 r/min for 10 min, and at the same time, the hydrochloric acid solution was dropwise added to the oil phase using a peristaltic pump at 6 mL/min to obtain the emulsified acid system. The prepared emulsified acid system was subjected to performance testing, and the results were shown in Table 19.

TABLE 19

| | Performance of the emulsified acid system | | | | |
|---|---|---|---|---|---|
| Viscosity (mPa · s) | Demulsification rate (%, at 160° C. for 7 h) | Conductivity (µs/cm) | Acid-rock reaction rate ($10^{-6}$ mol/cm$^2$ · s) | Friction relative to clean water (%) | Corrosion rate of steel plate (mm/a) |
| 15 | 1.5 | 0.061 | 1.41 | 93 | 1.3725 |

EXAMPLE 20

Provided herein was an emulsified acid system with ultra-high temperature resistance, low viscosity and low corrosiveness, consisting of: 4 parts by weight of a viscoelastic surfactant with 2 hydrophobic tails which was prepared from 3,3'-iminobis (N,N-dimethylpropylamine) and a halogenated undecane, 4 parts by weight of alkyl phenol polyoxyethylene ether, 2 parts by weight of Mannich base synthesized by a reaction of ethanediamine, acetophenone and formaldehyde, 2 parts by weight of sodium erythorbate, 30 parts by weight of hydrochloric acid and diesel oil.

The above emulsified acid system was prepared through the following steps.

The viscoelastic surfactant and the Mannich base were added to the diesel oil, and the sodium erythorbate was added to hydrochloric acid. The oil phase was dispersed using a high-speed disperser at 2800 r/min for 10 min, and at the same time, the hydrochloric acid solution was dropwise added to the oil phase using a peristaltic pump at 6 mL/min to obtain the emulsified acid system. The prepared emulsified acid system was subjected to performance testing, and the results were shown in Table 20.

TABLE 20

Performance of the emulsified acid system

| Viscosity (mPa·s) | Demulsification rate (%, at 160° C. for 7 h) | Conductivity (μs/cm) | Acid-rock reaction rate ($10^{-6}$ mol/cm$^2$·s) | Friction relative to clean water (%) | Corrosion rate of steel plate (mm/a) |
|---|---|---|---|---|---|
| 16 | 1.6 | 0.067 | 1.41 | 92 | 1.3734 |

EXAMPLE 21

Provided herein was a method of preparing a viscoelastic surfactant in the emulsifier with ultra-high temperature resistance, low viscosity and low corrosiveness, which was specifically described as follows.

1 mol of butanolamine was dissolved in 50 mL of absolute ethanol.

2 mol of epichlorohydrin was dropwise added to the solution of butanolamine in absolute ethanol at a rate of 7 mL/min. After reacted at room temperature for 10 h, the reaction mixture was subjected to vacuum distillation for 3 h with the use of an oil pump to remove the solvent to obtain a colorless, highly-viscous and transparent liquid (96.8% yield).

1 mol of the colorless, highly-viscous and transparent liquid formed by the reaction of butanolamine and epichlorohydrin and 2 mol of erucic acid acyl propyl dimethylamine were added into a single-neck flask, to which 50 mL of absolute ethanol was added. After heated to 80° C. in an oil bath, the reaction mixture was reacted under reflux for 10 h and then subjected to rotary evaporation to remove the solvent to obtain a yellowish-brown paste viscoelastic surfactant with a yield of 93.6%.

The emulsified acid system provided herein consisted of 4 parts by volume of the viscoelastic surfactant prepared herein, 4 parts by volume of alkylphenol polyoxyethylene ether, 2 parts by volume of Mannich base synthesized by a reaction of ethanediamine, acetophenone and formaldehyde, 2 parts by volume of sodium erythorbate, 30 parts by volume of hydrochloric acid and diesel oil.

The above emulsified acid system was prepared through the following steps.

The viscoelastic surfactant and the Mannich base were added to the diesel oil, and the sodium erythorbate was added to hydrochloric acid. The oil phase was dispersed using a high-speed disperser at 2800 r/min for 10 min, and at the same time, the hydrochloric acid solution was dropwise added to the oil phase using a peristaltic pump at 6 mL/min to obtain the emulsified acid system. The prepared emulsified acid system was subjected to performance testing, and the results were shown in Table 21.

TABLE 21

Performance of the emulsified acid system

| Viscosity (mPa·s) | Demulsification rate (%, at 160° C. for 7 h) | Conductivity (μs/cm) | Acid-rock reaction rate ($10^{-6}$ mol/cm$^2$·s) | Friction relative to clean water (%) | Corrosion rate of steel plate (mm/a) |
|---|---|---|---|---|---|
| 23 | 1.1 | 0.067 | 1.37 | 89 | 1.3246 |

EXAMPLE 22

Provided herein was a method of preparing an emulsifier with ultra-high temperature resistance, low viscosity and low corrosiveness, which was specifically described as follows.

(1) Preparation of Component A 1 mol of butanolamine was dissolved in 50 mL of absolute ethanol.

3 mol of epichlorohydrin was dropwise added to the solution of butanolamine in absolute ethanol at a rate of 6 mL/min. After reacted at room temperature for 12 h, the reaction mixture was subjected to vacuum distillation for 3 h with the use of an oil pump to remove the solvent to obtain a colorless, highly-viscous and transparent liquid (95.4% yield).

1 mol of the colorless, highly-viscous and transparent liquid formed by the reaction of butanolamine and epichlorohydrin and 3 mol of erucic acid acyl propyl dimethylamine were added into a single-neck flask, to which 50 mL of absolute ethanol was added. After heated to 70° C. in an oil bath, the reaction mixture was reacted under reflux for 12 h and then subjected to rotary evaporation to remove the solvent to obtain a yellowish-brown paste component A with a yield of 95.3%.

(2) Preparation of Component B 1 mol of 1,6-butanediamine was dissolved in 50 mL of absolute ethanol.

5 mol of epichlorohydrin was dropwise added to the solution of 1,6-butanediamine in absolute ethanol at a rate of 9 mL/min under stirring conditions. After reacted at room temperature for 12 h, the reaction mixture was subjected to vacuum distillation for 4 h with the use of an oil pump to remove the solvent to obtain a colorless, highly-viscous and transparent liquid (97.4% yield).

1 mol of the colorless, highly-viscous and transparent liquid formed by the reaction of 1,6-butanediamine and epichlorohydrin and 4 mol of erucic acid acyl propyl dimethylamine were added into a single-neck flask, to which 50 mL of absolute ethanol was added. After heated to 90° C. in an oil bath, the reaction mixture was reacted under reflux for 7 h and then subjected to rotary evaporation to remove the solvent to obtain a yellowish-brown paste component B with a yield of 96.8%.

(3) Preparation of Component C 2 mol of diallylamine was dissolved in 60 mL of absolute ethanol.

2 mol of epichlorohydrin was dropwise added to the solution of diallylamine in absolute ethanol at a rate of 9 mL/min under stirring conditions. After reacted at room temperature for 10 h, the reaction mixture was subjected to vacuum distillation for 5 h with the use of an oil pump to remove the solvent to obtain a colorless, highly-viscous and transparent liquid (95.4% yield).

1 mol of the colorless, highly-viscous and transparent liquid formed by the reaction of diallylamine and epichlorohydrin and 1.5 mol of erucic acid acyl propyl dimethylamine were added into a single-neck flask, to which 60 mL of absolute ethanol was added. After heated to 90° C. in an oil bath, the reaction mixture was reacted under reflux for 8 h and then subjected to rotary evaporation to remove the solvent to obtain a yellowish-brown paste component C with a yield of 97.2%.

The emulsifier of this example included the above components A, B and C.

The emulsified acid system provided herein consisted of 40 parts by volume of an oil phase and 60 parts by volume of an acid phase, where the oil phase consisted of 3.5% by volume of component A, 3.5% by volume of component B, 3% by volume of component C and diesel oil, and the acid phase consisted of 1% by volume of a corrosion inhibitor and 1% by volume of a ferric ion stabilizer, and a hydrochloric acid solution with a volume concentration of 30%.

The above emulsified acid system was prepared through the following steps.

The viscoelastic surfactant and the Mannich base were added to the diesel oil, and the sodium erythorbate was added to hydrochloric acid. The oil phase was dispersed using a high-speed disperser at 2800 r/min for 10 min, and at the same time, the hydrochloric acid solution was dropwise added to the oil phase using a peristaltic pump at 6 mL/min to obtain the emulsified acid system. The prepared emulsified acid system was subjected to performance testing, and the results were shown in Table 22.

TABLE 22

| | Performance of the emulsified acid system | | | | |
|---|---|---|---|---|---|
| Viscosity (mPa · s) | Demulsification rate (%, at 160° C. for 7 h) | Conductivity (µs/cm) | Acid-rock reaction rate ($10^{-6}$ mol/cm$^2$ · s) | Friction relative to clean water (%) | Corrosion rate of steel plate (mm/a) |
| 20 | 1.15 | 0.072 | 1.40 | 91 | 1.3233 |

EXAMPLE 23

Provided herein was an emulsifier with ultra-high temperature resistance, low viscosity and low corrosiveness, which was prepared through the following method.

2 mol of diallylamine was dissolved in 60 mL of absolute ethanol.

2 mol of epichlorohydrin was added dropwise to the solution of diallylamine in ethanol at a rate of 9 mL/min under stirring. After reacted at room temperature for 10 h, the reaction mixture was subjected to vacuum distillation for 5 h with the use of an oil pump to remove the solvent to obtain a colorless, highly-viscous and transparent liquid with a yield of 95.4%.

1 mol of the colorless, highly-viscous and transparent liquid termed by the reaction of diallylamine and epichlorohydrin and 1.5 mol of erucic acid acyl propyl dimethylamine were added into a single-neck flask, to which 60 mL of absolute ethanol was added. After heated to 90° C. in an oil bath, the reaction mixture was reacted under reflux for 8 h and then subjected to rotary evaporation to remove the solvent to obtain a yellowish-brown paste viscoelastic surfactant with a yield of 97.2%.

The emulsified acid system provided herein consisted of 4 parts by volume of the viscoelastic surfactant prepared herein, 4 parts by volume of alkyl phenol polyoxyethylene ether, 2 parts by volume of Mannich base synthesized by a reaction of ethanediamine, acetophenone and formaldehyde, 2 parts by volume of sodium erythorbate, 30 parts by volume of hydrochloric acid, and diesel oil.

The above emulsified acid system was prepared through the following steps.

The viscoelastic surfactant and the Mannich base were added to the diesel oil, and the sodium erythorbate was added to hydrochloric acid. The oil phase was dispersed using a high-speed disperser at 2800 r/min for 10 min, and at the same time, the hydrochloric acid solution was dropwise added to the oil phase using a peristaltic pump at 6 mL/min to obtain the emulsified acid system. The prepared emulsified acid system was subjected to performance testing, and the results were shown in Table 23.

TABLE 23

Performance of the emulsified acid system

| Viscosity (mPa·s) | Demulsification rate (%, at 160° C. for 7 h) | Conductivity (μs/cm) | Acid-rock reaction rate ($10^{-6}$ mol/cm$^2$·s) | Friction relative to clean water (%) | Corrosion rate of steel plate (mm/a) |
|---|---|---|---|---|---|
| 20 | 1.13 | 0.069 | t.41 | 91 | 1.3247 |

What is claimed is:

1. An emulsifier, comprising:
a viscoelastic surfactant;
wherein the viscoelastic surfactant is prepared by a quaterisation of fatty acid acyl propyl dimethylamine and a halogenated compound.

2. The emulsifier of claim 1, wherein the viscoelastic surfactant comprises at least one hydrophobic chain.

3. The emulsifier of claim 1, wherein the viscoelastic surfactant is cationic or zwitterionic.

4. The emulsifier of claim 1, wherein a fatty acid chain in the fatty acid acyl propyl dimethylamine is derived from erucic acid, docosanoic acid, oleic acid, stearic acid, arachidic acid, tetracosenic acid, heneicosanoic acid, heptadecanoic acid, hexadecanoic acid, pentadecanoic acid, tridecanoic acid, dodecanoic acid or undecanoic acid.

5. An emulsified acid system, comprising: 5-10 parts by weight of the emulsifier of claim 1, 30-40 parts by weight of an acid solution and 50-65 parts by weight of an auxiliary.

6. The emulsified acid system of claim 5, wherein the acid solution is hydrochloric acid, mud acid or an organic acid.

7. The emulsified acid system of claim 5, wherein the auxiliary comprises 2-5 parts by weight of a corrosion inhibitor, 2-5 parts by weight of a ferric ion stabilizer and diesel oil.

8. The emulsified acid system of claim 7, wherein the corrosion inhibitor is Mannich base synthesized from ethylenediamine, acetophenone and formaldehyde; and the ferric ion stabilizer is sodium erythorbate.

9. The emulsified acid system of claim 5, wherein the auxiliary further comprises sorbitan fatty acid ester polyoxyethylene ether, fatty alcohol-polyoxyethylene ether, alkyl phenol polyoxyethylene ether, polyoxyethylene castor oil ether, fatty alcohol polyoxyethylene ester, fatty acid polyoxyethylene ester, polyethylene glycol, alkyl amine polyoxyethylene ether, polyoxyethylene fatty acid ester, a derivative thereof or a combination thereof.

* * * * *